(12) United States Patent
Borkovic et al.

(10) Patent No.: US 11,182,314 B1
(45) Date of Patent: Nov. 23, 2021

(54) LOW LATENCY NEURAL NETWORK MODEL LOADING

(71) Applicant: Amazon Technologies, Inc., Seattle, WA (US)

(72) Inventors: Drazen Borkovic, Los Altos, CA (US); Ilya Minkin, Los Altos, CA (US); Vignesh Vivekraja, Santa Clara, CA (US); Richard John Heaton, San Jose, CA (US); Randy Renfu Huang, Morgan Hill, CA (US)

(73) Assignee: Amazon Techaologies, Inc., Seattle, WA (US)

( * ) Notice: Subject to any disclaimer, the term of this patent is extended or adjusted under 35 U.S.C. 154(b) by 63 days.

(21) Appl. No.: 16/698,761

(22) Filed: Nov. 27, 2019

(51) Int. Cl.
*G06F 13/20* (2006.01)
*G06F 13/10* (2006.01)
*G06N 3/04* (2006.01)

(52) U.S. Cl.
CPC .............. *G06F 13/20* (2013.01); *G06F 13/10* (2013.01); *G06N 3/04* (2013.01); *G06F 2213/40* (2013.01)

(58) Field of Classification Search
CPC .................................. G06F 13/10; G06N 3/04
See application file for complete search history.

(56) References Cited

U.S. PATENT DOCUMENTS

| | | | | |
|---|---|---|---|---|
| 9,928,460 | B1* | 3/2018 | Nowatzyk | H04B 1/16 |
| 10,831,693 | B1* | 11/2020 | Huang | G06F 13/42 |
| 10,922,146 | B1* | 2/2021 | Minkin | G06F 8/41 |
| 2018/0232627 | A1* | 8/2018 | Rozen | G06N 3/08 |
| 2019/0050265 | A1* | 2/2019 | Vijayaraghavan | G06N 3/0445 |
| 2019/0114533 | A1* | 4/2019 | Ng | G06N 3/04 |
| 2019/0340493 | A1* | 11/2019 | Coenen | G06N 3/063 |

* cited by examiner

*Primary Examiner* — Getente A Yimer
(74) *Attorney, Agent, or Firm* — Weaver Austin Villeneuve & Sampson LLP

(57) ABSTRACT

An integrated circuit device implementing a neural network accelerator may have a peripheral bus interface to interface with a host memory, and neural network models can be loaded from the host memory onto the state buffer of the neural network accelerator for execution by the array of processing elements. The neural network accelerator may also have a memory interface to interface with a local memory. The local memory may store neural network models from the host memory, and the models can be loaded from the local memory into the state buffer with reduced latency as compared to loading from the host memory. In systems with multiple accelerators, the models in the local memory can also be shared amongst different accelerators.

21 Claims, 9 Drawing Sheets

LOW LATENCY NEURAL NETWORK MODEL LOADING

BACKGROUND

Neural networks can be used to performed various complex data analyses and tasks. Complex neural networks may utilize deep learning to enable machines to perform human-like functions with high accuracy. Such deep learning applications may include object recognition, text-to-speech conversion, real-time language translation, etc. Implementing these applications may require the neural network to support tens to hundreds of models. For example, object recognition may require a different model for different objects, text-to-speech conversion applications may require a different model for each voice, real-time language translation may require a different model for each language, etc.

BRIEF DESCRIPTION OF THE DRAWINGS

Various embodiments in accordance with the present disclosure will be described with reference to the drawings, in which.

DETAILED DESCRIPTION

Figure 1:
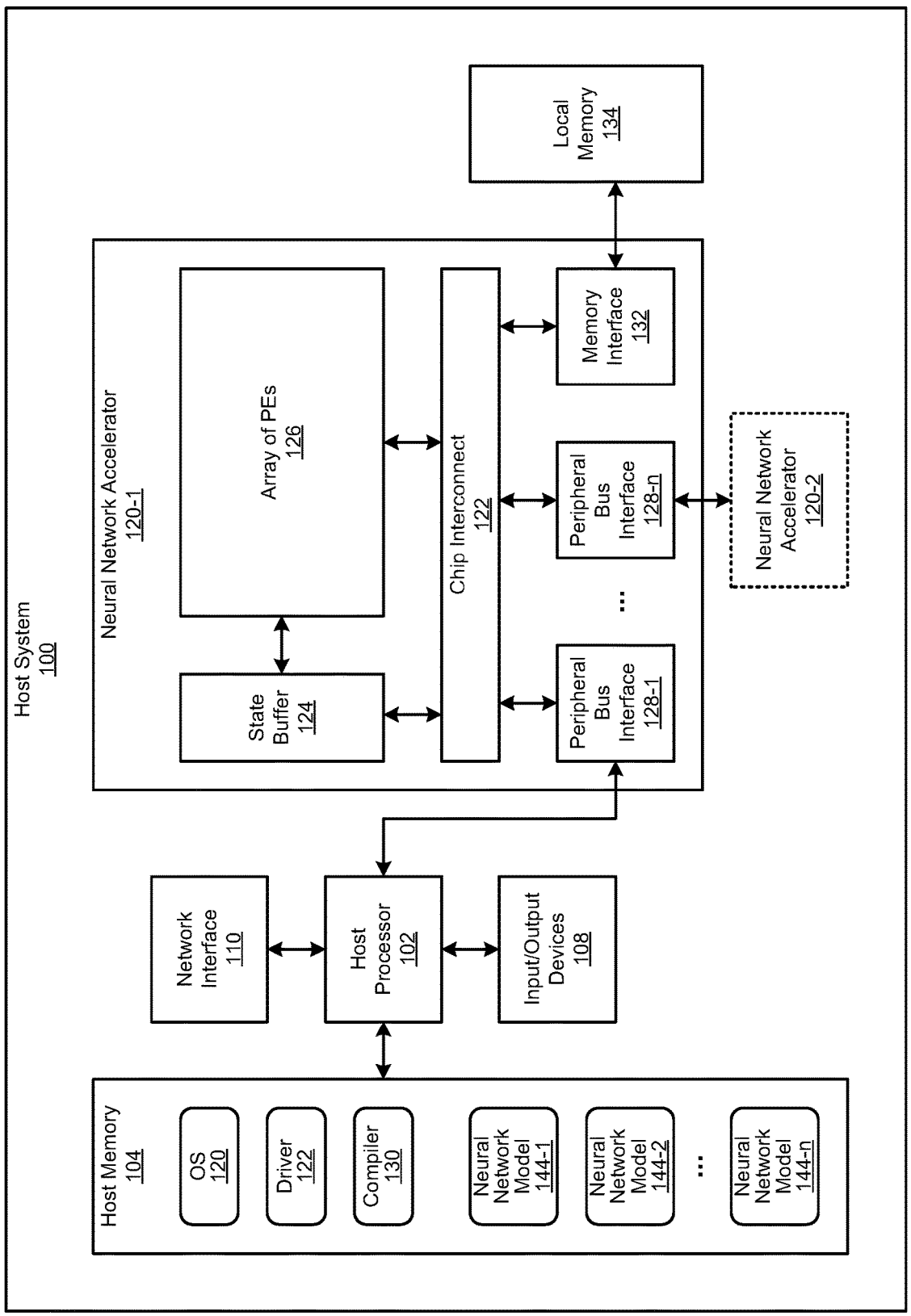
FIG. 1 is a block diagram of an example of a host system having a neural network accelerator.

Neural networks can be implemented using computing systems with specialized accelerators to improve performance. Such accelerators may include circuitry that can optimize parallel complex computations such as matrix multiplication operations. These matrix multiplication operations may involve multiplying feature map matrices obtained from input data with weight matrices to derive weighted sums to make certain decisions. By way of example, in a real-time language translation applications, the feature map matrices may represent input voice samples, and the weight matrices may represent a language model. Translation into a first language may use a different set of weight matrices than translation into a second language. Collectively, the set of weight matrices and instructions on what computations to perform on the set of weight matrices may be referred to as a neural network model. Thus, continuing with the language translation example, each language may have its own separate neural network model.

Although neural network accelerators can execute complex computations on a given set of weight matrices much faster than standard processors, applications that use many different neural network models can be hindered by the latency required to load and switch out the different models on the accelerator. Neural network systems that support a large number of different models can store the models in a host memory of the host computing system. During execution of the neural network, a model can be retrieved from the host memory and loaded onto the neural network accelerator to enable the accelerator to perform computations using the instructions and weight values of the model. As execution proceeds and the neural network switches to use a different model, the next model can be loaded from the host memory onto the accelerator. However, the data transfer bandwidth of the interface between the host memory and the accelerator can be limited. While the latency in loading a model from the host memory may be acceptable in some applications, in applications that require real-time or near real-time decision making such as object recognition for navigation, real-time speech translations, and the like, the latency required to load a neural network model onto an accelerator can result in noticeable lag in the system response time causing the system to perform poorly for its intended purpose.

To reduce the latency of loading a neural network model onto the accelerator for execution, an accelerator can utilize a local memory to store models from the host memory. The memory interface between the local memory and the accelerator may have a much higher data transfer bandwidth than the interface between the host memory and the accelerator. As a result, loading of a neural network model from the local memory onto the accelerator can be achieved at a much lower latency as compared to loading the model from the host memory onto the accelerator. By way of example, the interface between the host memory and the accelerator can be a peripheral bus interface such as peripheral component interconnect express (PCIe) interface having a data transfer bandwidth of 32 GB/s, whereas the interface between the local memory and the accelerator can be a memory interface such as high bandwidth memory (HBM) interface having a data transfer bandwidth of 256 GB/s. Under this example, a neural network model being loaded from the local memory can potentially be completed 8× faster as compared to being loaded from the host memory.

In some implementations, the neural network models can be transferred from the host memory onto the local memory in the background while the accelerator is performing computations. For example, at the start of executing the neural network, a first model can be loaded onto the accelerator from the host memory for immediate execution. As the accelerator is performing computations on this first model, additional models that may be used by the application for future computations can be retrieved from the host memory and stored in the local memory. This can be achieved, for example, by using direct memory access (DMA) to write to the local memory without interrupting the computations being performed by the accelerator. As the computations using the current model completes and a different model is needed, a new model can be loaded onto the accelerator from the local memory instead of the host memory. In some implementations, multiple models can be preloaded onto the local memory prior to running the neural network, and the initial and subsequent models can be loaded onto the accelerator from the local memory. If the capacity of the local memory is insufficient to store all the models needed by the neural network, models stored in the local memory that are no longer needed for upcoming computations can be swapped out with models for impending computations from the host memory.

To further enhance the performance of a neural network, some systems may employ multiple accelerators to perform concurrent computations using the same or different models in each accelerator. In these systems, the models stored in the local memory can be shared amongst the multiple accelerators that are communicatively coupled with each other. In some implementations, each accelerator may also have its own local memory to store the models used by the corresponding accelerator to reduce the model loading latency in each accelerator.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 includes a block diagram illustrating an example of a host system 100 that includes a neural network accelerator 120-1 to perform neural network computations. Host system 100 is an example of a computing device, and includes a host processor 102, a host memory 104, various input/output (I/O) devices 108, and at least one network interface 110. Neural network accelerator 120-1, which may also be referred to as a neural network processor, is an integrated circuit device with dedicated circuitry that can accelerate certain operations or computations performed by the host system 100. Host system 100 can be implemented as a server in a data center, a desktop computer, a laptop computer, a tablet computer, or a smartphone, among other examples. In some examples, operations or components discussed below as being performed or included in host system 100 can be performed or be included in other computer devices. For example, compiler 130 can execute on host system 100 while the neural network accelerator 120-1 is located at a different host system.

Host processor 102 is an integrated circuit device that can execute program code in the form of instructions. The program code can be instructions for executing various software applications or tools, such as an operating system 120 or a compiler 130. While host processor 102 is executing a program, the instructions for the program can be stored in the host memory 104. The instructions can also be stored elsewhere, such as on a storage device, and can be loaded into host processor 102 when needed by host processor 102. Host processor 102 can also use host memory 104 for temporary storage of other data on which host processor 102 is operating. In various examples, host memory 104 can be implemented using a volatile memory type, such as a type of Random Access Memory (e.g., DRAM), although non-volatile memory types can, alternatively or additionally, be used for host memory 104. Any of the components stored in host memory 104 can alternatively and/or additionally be stored on a storage device external to host memory 104, such as a magnetic disk drive, a solid state drive, an optical drive, or other non-volatile memory. Such a storage device can also be non-transitory such that program code and other data stored on the storage device remains present when the storage device is not powered on.

Other components that can be coupled to host processor 102 to add functionality to the host system 100 may include peripheral devices such as the input/output (I/O) devices 108 and the network interface 110. I/O devices 108 can include user input and output devices, such as keyboards, mice, touch screens, microphones, display screens, speakers, printers, and scanners, among other examples. Network interface 110, which can be implemented using a network interface card, can provide access to one or more networks. Network interface 110 can include, for example, a physical port for connecting a network cable and/or wireless antennas for communicating with WiFi and/or wireless networks. Network interface 110 can also be described as an I/O device.

Neural network accelerator 120-1 is another type of peripheral device that can enhance the functionality of host system 100. Neural network accelerator 120-1 may be a device that is purpose-built to perform certain operations that can be performed by host processor 102, but can be performed faster by neural network accelerator 120-1. For example, neural network accelerator 120-1 may have the capability to perform large scale, parallel computations of a neural network more efficiently than when the computations are performed by host processor 102. Neural network accelerator 120-1 can execute program code to perform certain operations. For example, neural network accelerator 120-1 can be programmed to execute a particular neural network, such as one that performs image recognition or one that performs language translation, etc. As a further example, to support the execution of a neural network, neural network accelerator 120-1 can be programed to perform operations such as copying parameters used for computations (e.g., weight values) and input data for the neural network from host memory 104 into neural network accelerator 120-1, and/or copying results from the neural network accelerator 120-1 to host memory 104, among other examples.

To generate program code and models for neural network accelerator 120-1, host system 100 can execute compiler 130. Compilers, in general, are software programs that translate program code written in a human-readable language into a format (e.g., machine instructions or binaries) that can be read and processed by an integrated circuit device. In the example of FIG. 1, compiler 130 can be used to compile a neural network description into instructions and models to be executed by neural network accelerator 120-1. Compiler 130 can be activated, for example, when operating system 120 receives keyboard, mouse, touchscreen, voice commands, or other inputs from the I/O devices 108. The inputs can further include parameters for compiler 130, such as the input code to compile, and configuration options for the compilation process. Processing of the input code can include sorting the operations described in the input code into layers, where the outputs of one layer may provide the inputs to the next layer. Processing of the input code can also include identifying steps to be performed by host processor 102. For example, host processor 102, through the execution of a driver 122, may perform steps such as configuring Direct Memory Access (DMA) descriptors for moving data into or out of neural network accelerator 120-1, among other examples.

Compiler 130 may generate intermediate output that can be organized, for example, in the layers, nodes, and connections between nodes of a neural network. The operations of the layer or node of the intermediate output can then be broken down into smaller operations to accommodate the computing capacity of neural network accelerator 120-1. Processing of the intermediate output can also include other steps, such as scheduling, or determining the order in which neural network accelerator 120-1 and/or host processor 102 will perform the operations, among other examples. Instructions to be executed by neural network accelerator 120-1 can then be generated, for example, by removing redundant dependencies, resolving or handling dependencies between nodes by inserting synchronization instructions into the code, identifying possibly optimizations in memory usage or memory bandwidth usage, and other operations. In addition, parameters such as weight values that the instructions operate on can also be generated. Collectively, the instructions of the compiled code and the weight values may be referred to as a neural network model. In other implementations, a neural network model may refer to just the set of weight values. In some neural networks such as object recognition, text-to-speech conversion, real-time language translation, and the like, multiple neural network models such as models 144-1 to 144-n can be generated for different aspects of the neural network (e.g., different objects being recognized, different voices; different languages, etc.). The generated neural network models 144-1 to 144-n can be stored on host memory 104 and/or on a storage device for later retrieval by neural network accelerator 120-1.

In the example of FIG. 1, host system 100 can be executing a driver 122, which can also be referred to as a device driver or runtime driver, that manages neural network accelerator 120-1. Driver 122 can provide an interface between applications executing on host system 100 (or on another host system) and neural network accelerator 120-1. For example, driver 122 can provide an Application Program Interface (API) that defines functions for feeding input data to neural network accelerator 120-1 and defining the operation to perform on the input data. In this and other examples, driver 122 can configure neural network accelerator 120-1 to perform the operation. For example, driver 122 can identify a neural network that neural network accelerator 120-1 is to execute, as well as the location in host memory 104 (or on a storage device) where the one or more models for the neural network is located. Driver 122 can further load into neural network accelerator 120-1 or cause the acceleration engine 112 to load one or more neural network models 144-1 to 144-n, can load or cause neural network accelerator 120-1 to load the input data on which the neural network is to operate, and/or can cause neural network accelerator 120-1 to being executing on the input data. Once neural network accelerator 120-1 has finished, neural network accelerator 120-1 can notify the driver 122, and the driver 122 can deliver a result back to the application that requested the result.

Neural network accelerator 120-1 may include a state buffer 124 that is used to store input data, weight values, and/or instructions in preparation for computations to be performed by an array of processing elements (PEs) 126. The weight values and/or instructions stored by state buffer 124 may correspond to one or more neural network models 144-1 to 144-n, and can be retrieved, for example, from host memory 104 (or a storage device) for execution by the array of PEs 126. The computational results of the array of PEs 126 can be store in a results buffer (not shown), and be fed back to state buffer 124 for further computations or to host system 100 by an activation engine and/or a pooling engine (both not shown) via a chip interconnect 122. Additional details of these and other blocks of neural network accelerator 120-1 are further described with reference to FIG. 5 below.

Neural network accelerator 120-1 may also include one or more peripheral bus interfaces 128-1 to 128-n to communicate with host system 100 and other peripheral devices. For example, any of peripheral bus interfaces 128-1 to 128-n can be implemented using a Peripheral Component Interconnect (PCI), PCI express (PCIe), or other suitable peripheral device connectivity interfaces. Neural network accelerator 120-1 may also include a memory interface 132 to couple neural network accelerator 120-1 to a local memory 134.

Local memory 134 can be implemented, for example, using high speed memories such as DRAMs. In some implementations, local memory 134 can be implemented using high bandwidth memory (HBM) DRAMs. In such implementations, memory interface 132 can be a memory controller supporting a HBM interface or other suitable interface to read and write data to and from local memory 134. In some implementations, host system 100 may include more than one neural network accelerator. The optional neural network accelerator such as neural network accelerator 120-2 may also be referred to as a neural network coprocessor, and may have a similar structure as neural network accelerator 120-1. Neural network accelerator 120-2 can be coupled to neural network accelerator 120-1 through a chip interconnect such as peripheral bus interface 128-n or other suitable chip-to-chip interface.

Loading a neural network model (e.g., any one of the neural network models 144-1 to 144-n) from host memory 104 onto state buffer 124 may incur certain latencies. For example, loading the model may require host processor 102 to perform memory access operations to obtain the model from host memory 104, and transfer the model into state buffer 124 through peripheral bus interface 128-1. In some implementations, DMA can be used to bypass host processor 102 to allow the model to be directly written into state buffer 124 without host processor 102 intervention. But even then, the loading speed of the model can be limited by the bandwidth capacity of peripheral bus interface 128-1. Local memory 134 can be used to improve model loading speed by loading the model onto the state buffer via memory interface 132 instead of peripheral bus interface 128-1. As mentioned above, the data transfer bandwidth of memory interface 132 can be much higher than peripheral bus interface 128-1 to overcome the bandwidth limitation of peripheral bus interface 128-1.

Local memory 134 can be managed, for example, by a runtime driver (e.g., driver 122) during execution of the neural network. The runtime driver may monitor the utilization of local memory 134, and determine which neural network models from host memory 104 to store in local memory 134. For example, the runtime driver may load models that are not immediately needed by neural network accelerator 120-1, and may load as many of such neural network models as the capacity of local memory 134 allows. A neural networked that may be needed for immediate execution can be loaded onto state buffer 124 instead of local memory 134. As space in local memory 134 runs out, the runtime driver may determine which model in local memory 134 can be discarded to free up space for other models that may be needed by the neural network for upcoming computations. For example, a model that has already been loaded into state buffer 124 can be discarded from local memory 134 if it is no longer needed by the neural network. In some implementations, the oldest or the least frequently used model in local memory 134 can be discarded first to make room for additional models.

The runtime driver may also maintain a mapping table that contains a mapping of each model to its corresponding location in local memory 134 and/or host memory 104. In this manner, the runtime driver can readily access any of the models needed by the neural network, and load the model into neural network accelerator 120-1 from the location with the least latency. For example, if a model exists in both host memory 104 and local memory 134, the runtime driver may decide to load the model from local memory 134 instead of host memory 104.

In some implementations, local memory 134 can also be used to improve the model loading speed for neural network accelerator 120-2. Referring to FIG. 1, loading a model from host memory 104 to neural network accelerator 120-2 may require the model to traverse through peripheral bus interface 128-1 and peripheral bus interface 128-2 before reaching neural network accelerator 120-2. In contrast, loading a model from local memory 134 may only require the model to traverse through memory interface 132 and just one peripheral bus interface 128-n. As such, local memory 134 can be used to share neural network models with other neural network accelerators coupled to neural network accelerator 120-1 to reduce the model loading latency.

Figure 2A:
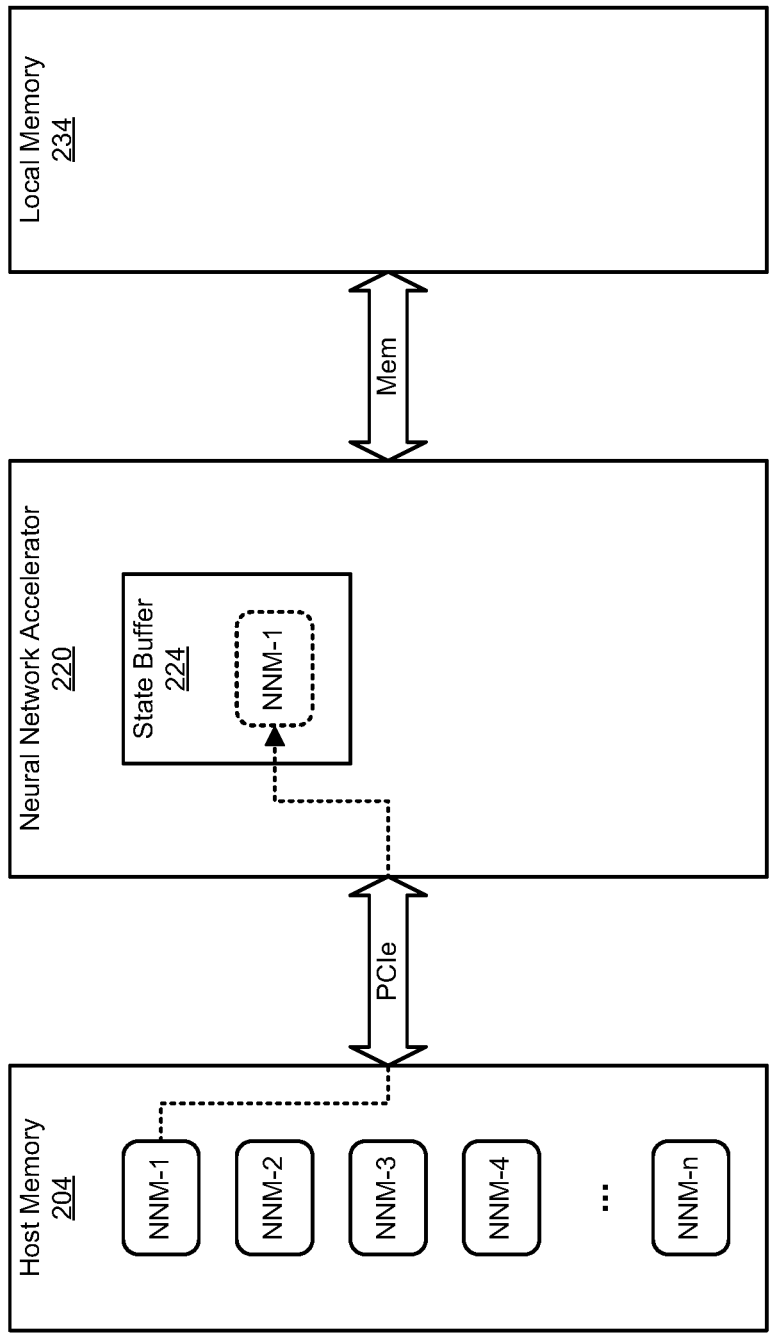
FIG. 2A illustrates loading of a neural network model from a host memory to a state buffer.
Figure 2B:
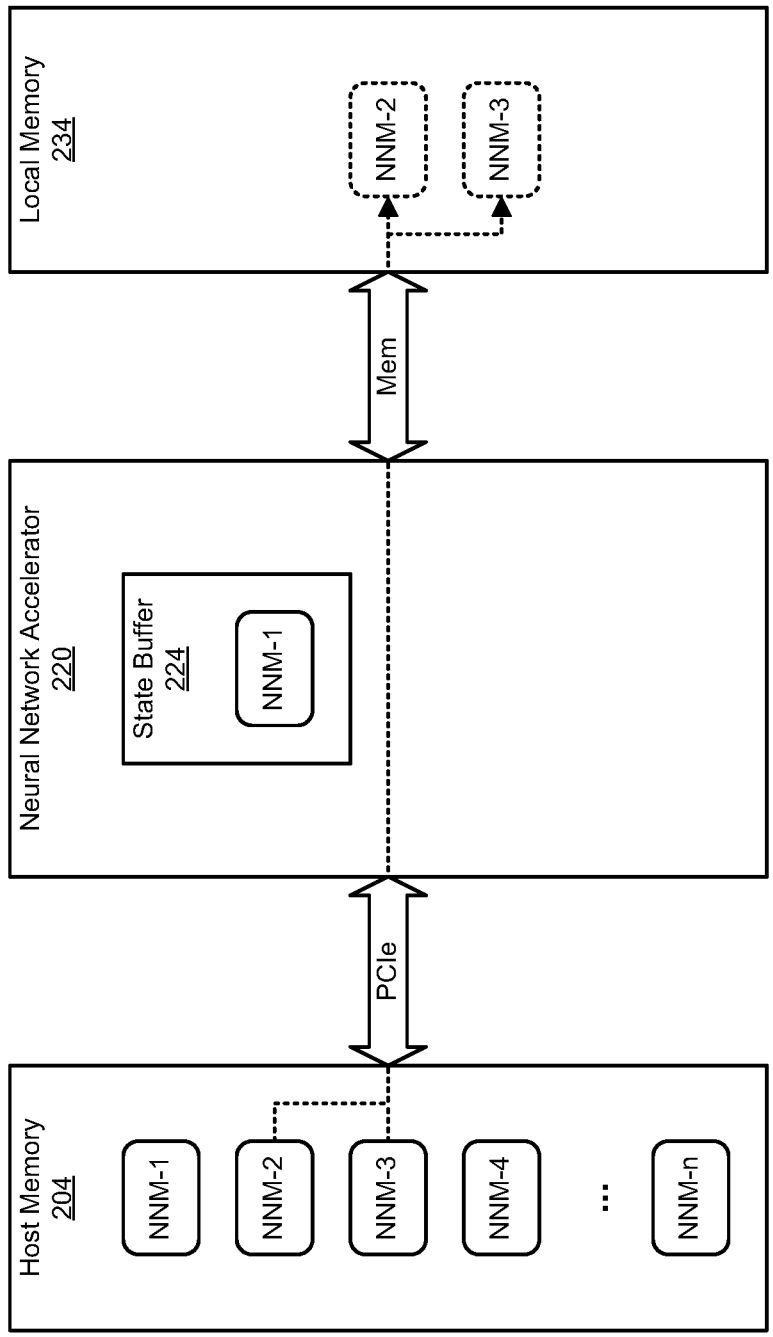
FIG. 2B illustrates loading of a neural network model from a host memory to a local memory.
Figure 2C:
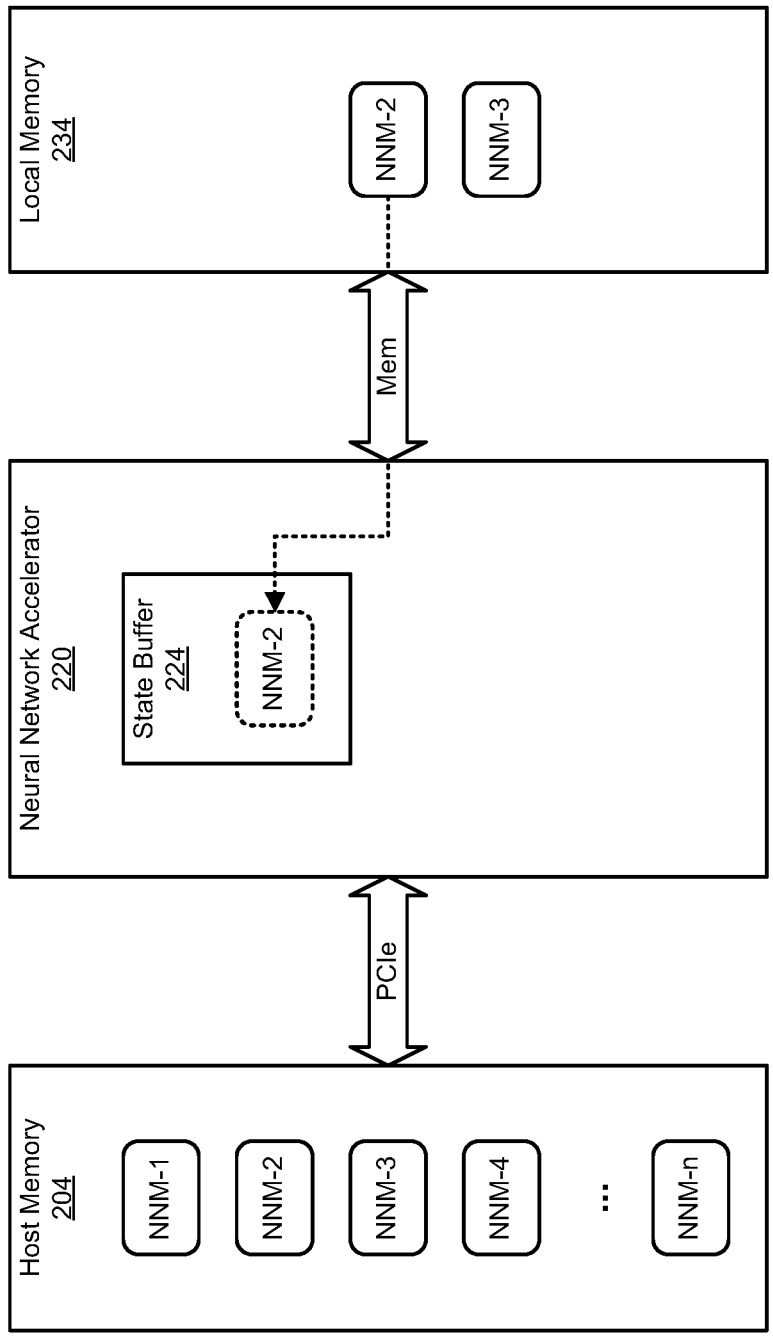
FIG. 2C illustrates loading of a neural network model from a local memory to a state buffer.

FIGS. 2A-2C show various states of a computing system to illustrate the use of a local memory to improve the neural network model loading latency of a neural network. Referring to FIG. 2A, a computing system (e.g., can be host system 100) may include a neural network accelerator 220. Neural network accelerator 220 may include an array of processing elements (not shown) and a state buffer 224 coupled to the array of processing elements. Neural network accelerator 220 may also include a peripheral bus interface (e.g., PCIe) for interfacing with a host memory 204, and a memory interface (e.g., memory interface such as HBM) for interfacing with a local memory 234. Host memory 204 may store a set of neural network models NNM-1 to NNM-n that were compiled previously for a particular neural network to be executed on neural network accelerator 220. For example, neural network models NNM-1 to NNM-n can be different models used as part of the same application (e.g., different languages of a language translation application). Each neural network model may include a set of weight values, or a set of weight values in combination with instructions for performing computations on the set of weight values.

At the start of execution of the neural network on neural network accelerator 220, the peripheral bus interface of neural network accelerator 220 can be configured to load neural network model NNM-1 from host memory 204 onto state buffer 224 for execution by the array of processing elements. In some implementations, depending on the size of the model and the storage capacity of state buffer 224, state buffer 224 can be configured to store multiple models concurrently, and more than one neural network model can be loaded onto state buffer 224. Once the first model NNM-1 used by the neural network has been transferred to state buffer 224, the weight values from model NNM-1 can be loaded from state buffer 224 onto the array of processing elements to begin computations on input data using the weight values. The computations can be used, for example, to determine an inference for a neural network, although the computations can also be used for other types of data analysis.

Referring to FIG. 2B, the peripheral bus interface can be configured to load a second neural network model NNM-2 onto local memory 234 from host memory 204. Loading of model NNM-2 onto local memory 234 can be performed during execution of the first neural network model NNM-1 by the array of processing elements. In other words, model NNM-2 can be loaded onto local memory 234 in the background while neural network accelerator 220 is performing computations using model NNM-1. In some implementations, assuming model NNM-2 is the next model expected to be used by the neural network, then model NNM-2 can be loaded onto local memory 234 if the number of cycles it takes to load model NNM-2 onto local memory 234 is less than or equal to the number of cycles it takes for completing the computations using model NNM-1. This can ensure that model NNM-2 is readily available from local memory 234 for loading onto state buffer 224 as soon as the computations on model NNM-1 complete.

If it will take longer to load model NNM-2 onto local memory 234 than it will take to complete the computations on model NNM-1, the system may decide not to transfer model NNM-2 to local memory 234. Then as soon as the computations using model NNM-1 completes, model NNM-2 can be loaded from host memory 204 onto state buffer 224 to start execution on the next model NNM-2. In such cases, a different neural network model can be loaded onto local memory 234 in the background. In the scenario shown in FIG. 2B, the number of cycles it takes to load both models NNM-2 and NNM-3 may be less than the number of cycles it takes to perform computations on NNM-1. As such, both models NNM-2 and NNM-3 can be transferred to local memory 234 while neural network accelerator 220 is performing computations using model NNM-1.

Continuing with the scenario shown in FIG. 2B, as execution using the model NNM-1 completes, instead of loading the next neural network model NNM-2 from host memory 204 to state buffer 224, the memory interface can be configured to load neural network model NNM-2 from local memory 234 onto the state buffer 224 for execution by the array of processing elements as shown in FIG. 2C. In some implementations, loading a neural network model from host memory 204 onto state buffer 224 may have a longer latency than loading the neural network model from local memory 234 onto state buffer 224. This can be attributed, for example, to the difference in data transfer bandwidth of the peripheral bus interface that interfaces with host memory 204 and the memory interface that interfaces with local memory 234. Accordingly, it can be advantageous to transfer neural network models to local memory 234 for low latency loading onto neural network accelerator 220.

As shown in FIG. 2C, local memory 234 can be configured to store multiple neural network models, and may even have the capacity to store all the models expected to be used by the neural network executing on neural network accelerator 220. In some implementations, all models expected to be used by the neural network can be preloaded onto local memory 234 to ensure all models can be loaded onto state buffer 224 with low latency. The decision as to whether to use local memory 234 for low latency loading can be determined, for example, based on a service level agreement with a user of the computing system. In other words, for users having a service level agreement from the computing system provided which guarantees low latency model loading, local memory 234 can be used. Whereas for users that do not require such low latencies, the neural network models can be loaded from the host memory instead.

In some implementations, local memory 234 may not have the capacity to store all the models expected to be used by the neural network. In such implementations, models for impending computations can be transferred to local memory 234 first, and models stored in local memory 234 can be swapped out as computations using those models are complete. In some implementations, the most commonly used models or the largest models that may take the longest to load can be stored in local memory 234 for low latency loading onto neural network accelerator 220. The selection of which models to store in local memory can also be made during runtime in response to results from previous computations, or from user input configuring the neural network (e.g., user input selecting the target languages for real-time translation, etc.).

Figure 3:
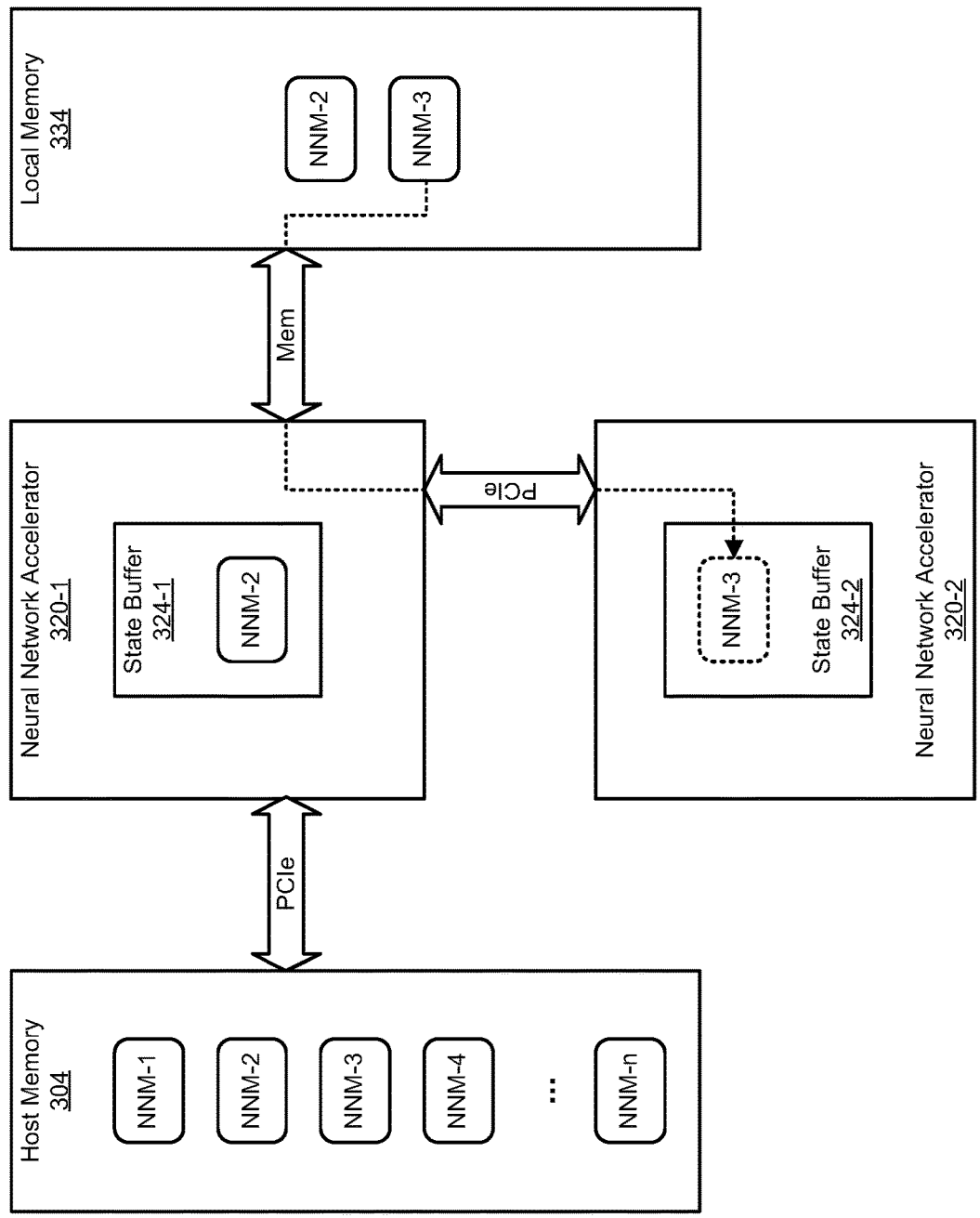
FIG. 3 illustrates loading of a neural network model from a local memory to a state buffer of a system having multiple accelerators.

FIG. 3 illustrates loading a neural network model in a computing system that has multiple neural network accelerators. Referring to FIG. 3, a computing system (e.g., can be host system 100) may include neural network accelerator 320-1 having its own state buffer 324-1 and array of processing elements, and neural network accelerator 320-2 also having its own state buffer 324-2 and array of processing elements. Neural network accelerator 320-1 can be coupled to host memory 304 via a first peripheral bus interface, and neural network accelerator 320-2 can be coupled to neural network accelerator 320-2 via a chip interconnect such as a second peripheral bus interface. As with the above examples, neural network accelerator 320-1 can be coupled to local memory 334 via a memory interface.

Continuing with the scenario shown in FIG. 2C in which models NNM-2 and NNM-3 have already been transferred to local memory 334, while neural network accelerator 320-1 is performing computations on model NNM-2 using the array of processing elements of neural network accelerator 320-1, neural network model NNM-3 can be loaded onto state buffer 324-2 of neural network accelerator 320-2 as shown in FIG. 3. It should be noted that loading model NNM-3 from local memory 334 onto state buffer 324-2 may still incur a shorter latency than loading model NNM-3 from host memory 304, because the path from host memory 304 to state buffer 324-2 traverses two peripheral bus interfaces as compared to the path shown in FIG. 3 which traverses one peripheral bus interface and one memory interface. In some implementations, model NNM-3 can also be loaded onto state buffer 324-1 to replace model NNM-2 as computations on model NNM-2 completes. In such a scenario, the same model stored in local memory 334 can be shared with multiple neural network accelerators, and parallel computations using the same model can be carried out.

Although not shown in FIG. 3, in some implementations, neural network accelerator 320-2 may have its own local memory. Models that are expected to be used by neural network accelerator 320-2 can be stored in the local memory of neural network accelerator 320-2 for low latency model loading. Moreover, as mentioned above, local memory 334 may not always have sufficient capacity to store all models expected to be used by the neural network. As such, the local memories of the respective neural network accelerators can be combined to provide additional capacity to store more models. For example, local memory 334 of neural network accelerator 320-1 can be used to store a first set of models, and the local memory (not shown) of network accelerator 320-2 can be used to store a second set of models. The models in each local memory can be selectively loaded onto either state buffer as needed to perform the computations of the neural network. In some implementations, the models stored in the local memories of respective neural network accelerators can be mutually exclusive, or copies of one or more models may be stored in multiple local memories.

Figure 4:
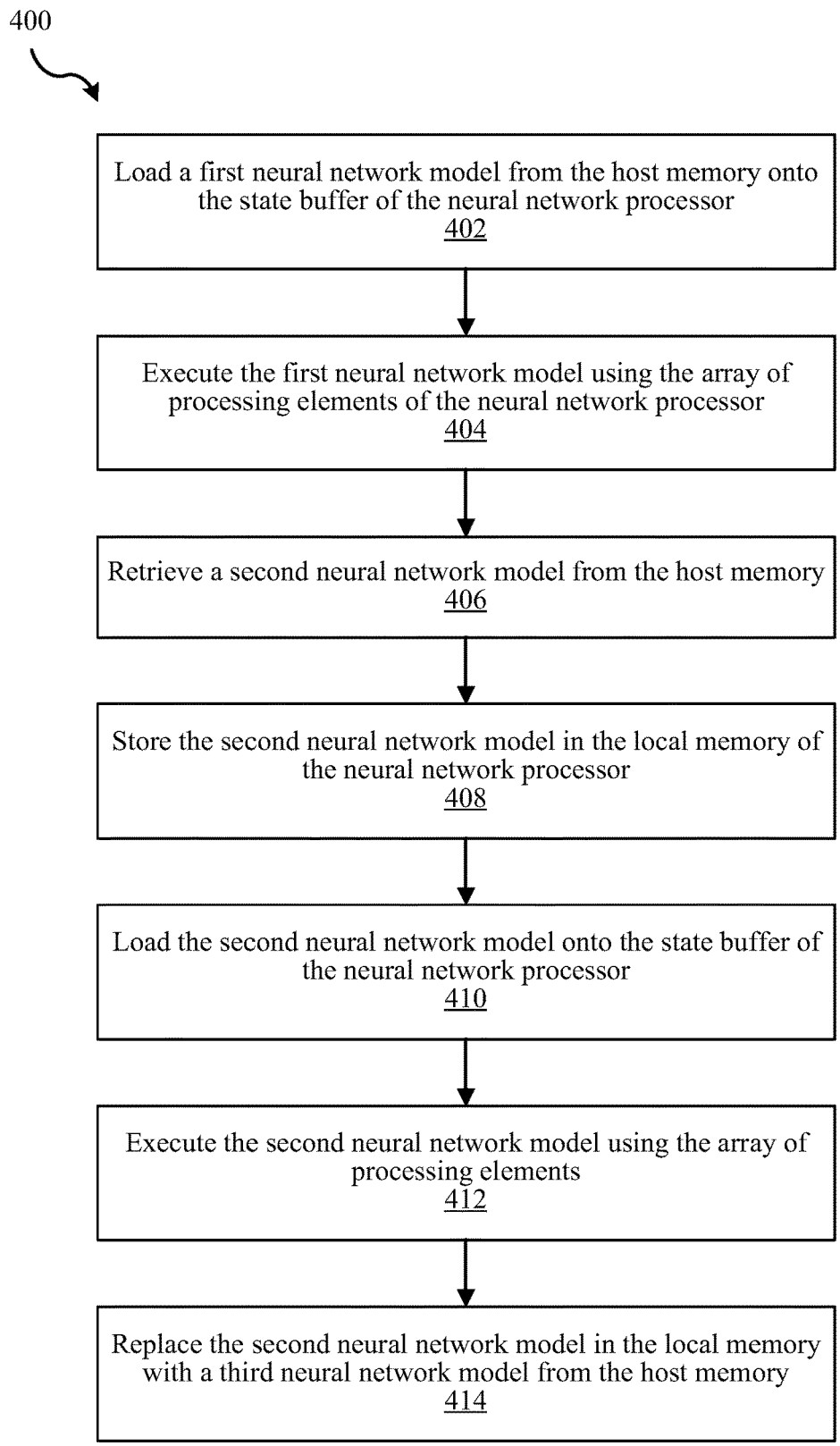
FIG. 4 illustrates a flow diagram of a process for loading neural network models.

FIG. 4 illustrates a process 400 that can be used to reduce the latency of loading a neural network model onto a neural network processor. Prior to execution of process 400, it is assumed that a set of neural network models are available and stored in a host memory of a host system. Process 400 may begin at block 402 by loading a first neural network model from the host memory onto a state buffer of the neural network processor via a peripheral bus interface. This neural network model can be the initial model that is executed by the neural network implemented in the neural network processor, and thus this model is loaded from the host memory to initiate execution of the neural network.

At block 404, the neural network processor may execute the first neural network model using an array of processing elements of the neural network processor. For example, the weight values from this first model and input data can be transferred from the state buffer and into the array of processing elements, and instructions of this first model can be executed to perform certain computations such as multiplication and accumulation of the input data and weight values in matrix multiplication operations.

At block 406, a second neural network model can be retrieved from the host memory, and stored in the local memory of the neural network processor at block 408. In some implementations, this second model can be retrieve from the host memory while the neural network processor is performing computations on the first model being executed at block 404. Additional neural network models can also be retrieved from the host memory and stored in the local memory. In some implementations, the models being stored at the local memory can be different models associated with the same application.

At block 410, as the computations on the first model being executed at block 404 completes, the neural network processor may load the second neural network model from the local memory onto the state buffer of the neural network processor. Loading the neural network model from the local memory onto the state buffer of the neural network processor can have a shorter latency than loading the neural network model from the host memory onto the state buffer of the neural network processor. For example, the memory interface to the local memory can have a higher data transfer bandwidth than the peripheral bus interface, and thus a model can be loaded faster from the local memory to reduce idle and wait times at the neural network processor.

At block 412, the neural network processor may execute the second neural network model using the array of processing elements. For example, the weight values from this second model and input data can be transferred from the state buffer and into the array of processing elements, and instructions of this second model can be executed to perform certain computations such as multiplication and accumulation of the input data and weight values of this second model in matrix multiplication operations.

At block 414, the second neural network model in the local memory can be replaced with a third neural network model from the host memory. For example, after the second neural network model has been loaded onto the state buffer, the second neural network model may no longer be needed by the neural network. As such, the second neural network model can be discarded from the local memory and be replaced with another neural network model that may be needed by the neural network for upcoming computations. In some implementations, the oldest model in the local memory and/or the least-frequently-used model in the local memory can be discarded to make room for other models that the neural network may use for upcoming computations.

In some implementations, the neural network processor can be coupled to a neural network coprocessor, and the neural network models stored in the local memory can be shared with the neural network coprocessor. For example, a third neural network model from the local memory can be loaded onto the state buffer of the neural network coprocessor. This can be done, for example, while the neural network processor is performing computations on the first model being executed at block 404.

Figure 5:
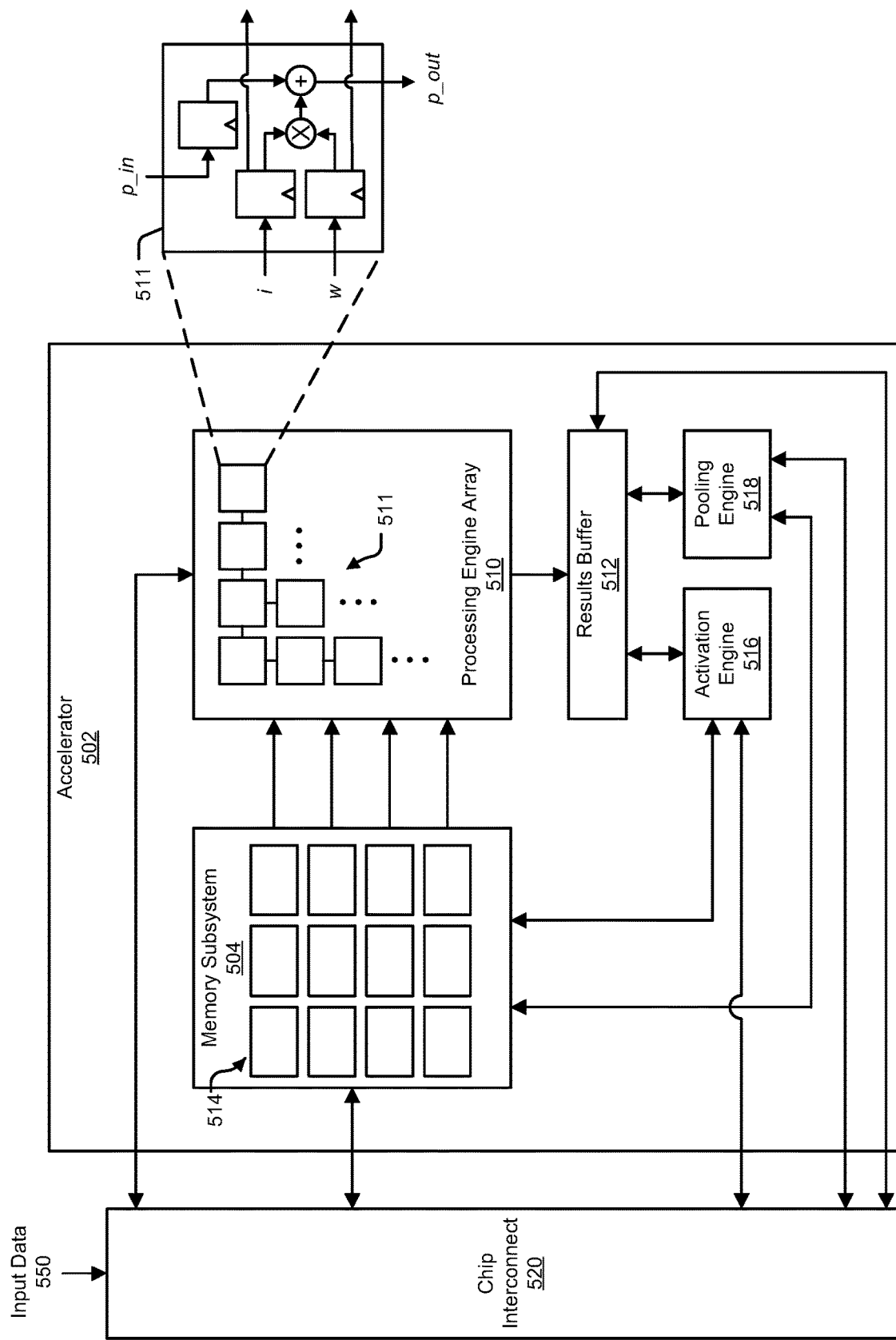
FIG. 5 is a block diagram illustrating an example of an integrated circuit device.

FIG. 5 is a block diagram illustrating an example of an integrated circuit device that can include an accelerator 502. In various examples, the accelerator 502, for a set of input data (e.g., input data 550), can execute computations using a processing engine array 510, an activation engine 516, and/or a pooling engine 518. In some examples, the example accelerator 502 may be an integrated circuit component of a processor, such as a neural network processor. The processor may have other integrated circuit components, including additional accelerator engines.

In various implementations, the memory subsystem 504 (may also be referred to as a state buffer) can include multiple memory banks 514. In these implementations, each memory bank 514 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 504 can permit simultaneous access to the read or write channels of multiple memory banks. As another example, the memory subsystem 504 can include arbitration logic such that arbitration between, for example, the outputs of multiple memory banks 514 can result in more than one memory bank's output being used. In these and other examples, though globally managed by the memory subsystem 504, each memory bank can be operated independently of any other.

Having the memory banks 514 be independently accessible can increase the efficiency of the accelerator 502. For example, values can be simultaneously read and provided to each row of the processing engine array 510, so that the entire processing engine array 510 can be in use in one clock cycle. As another example, the memory banks 514 can be read at the same time that results computed by the processing engine array 510 are written to the memory subsystem 504. In contrast, a single memory may be able to service only one read or write at a time. With a single memory, multiple clock cycles can be required, for example, to read input data for each row of the processing engine array 510 before the processing engine array 510 can be started.

In various implementations, the memory subsystem 504 can be configured to simultaneously service multiple clients, including the processing engine array 510, the activation engine 516, the pooling engine 518, and any external clients that access the memory subsystem 504 over a communication fabric 520. In some implementations, being able to service multiple clients can mean that the memory subsystem 504 has at least as many memory banks as there are clients. In some cases, each row of the processing engine array 510 can count as a separate client. In some cases, each column of the processing engine array 510 can output a result, such that each column can count as a separate write client. In some cases, output from the processing engine array 510 can be written into the memory banks 514 that can then subsequently provide input data for the processing engine array 510. As another example, the activation engine 516 and the pooling engine 518 can include multiple execution channels, each of which can be separate memory clients. The memory banks 514 can be implemented, for example, using static random access memory (SRAM).

In various implementations, the memory subsystem 504 can include control logic. The control logic can, for example, keep track of the address spaces of each of the memory banks 514, identify memory banks 514 to read from or write to, and/or move data between the memory banks 514. In some implementations, memory banks 514 can be hardwired to particular clients. For example, a set of memory banks 514 can be hardwired to provide values to the rows of the processing engine array 510, with one memory bank servicing each row. As another example, a set of memory banks can be hard wired to receive values from columns of the processing engine array 510, with one memory bank receiving data for each column.

The processing engine array 510 is the computation matrix of the example accelerator 502. The processing engine array 510 can, for example, execute parallel integration, convolution, correlation, and/or matrix multiplication, among other things. The processing engine array 510 includes multiple processing engines 511, arranged in rows and columns, such that results output by one processing engine 511 can be input directly into another processing engine 511. Processing engines 511 that are not on the outside edges of the processing engine array 510 thus can receive data to operate on from other processing engines 511, rather than from the memory subsystem 504.

In various examples, the processing engine array 510 uses systolic execution, in which data arrives at each processing engine 511 from different directions at regular intervals. In some examples, input data can flow into the processing engine array 510 from the left and weight values can be loaded at the top. In some examples weights and input data can flow from the left and partial sums can flow from top to bottom. In these and other examples, a multiply-and-accumulate operation moves through the processing engine array 510 as a diagonal wave front, with data moving to the right and down across the array. Control signals can be input at the left at the same time as weights, and can flow across and down along with the computation.

In various implementations, the number of columns in the processing engine array 510 determines the computational capacity of the processing engine array 510, and the number of rows determines the required memory bandwidth for achieving maximum utilization of the processing engine array 510. The processing engine array 510 can have, for example, 64 columns and 428 rows, or some other number of columns and rows.

An example of a processing engine 511 is illustrated in FIG. 5 in an inset diagram. As illustrated by this example, a processing engine 511 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 511.

In the illustrated example, an input from above can include a partial sum, p_in, provided either from another processing engine 511 or from a previous round of computation by the processing engine array 510. When starting a computation for a new set of input data, the top row of the processing engine array 510 can receive a fixed value for p_in, such as zero. As illustrated by this example, i and w are multiplied together and the result is summed with p_in to produce a new partial sum, p_out, which can be input into another processing engine 511. Various other implementations of the processing engine 511 are possible.

Outputs from the last row in the processing engine array 510 can be temporarily stored in the results buffer 512. The results can be intermediate results, which can be written to the memory banks 514 to be provided to the processing engine array 510 for additional computation. Alternatively, the results can be final results, which, once written to the memory banks 514 can be read from the memory subsystem 504 over the communication fabric 520, to be output by the system.

In some implementations, the accelerator 502 includes an activation engine 516. In these implementations, the activation engine 516 can combine the results from the processing engine array 510 into one or more output activations. For example, for a convolutional neural network, convolutions from multiple channels can be summed to produce an output activation for a single channel. In other examples, accumulating results from one or more columns in the processing engine array 510 may be needed to produce an output activation for a single node in the neural network. In some examples, activation engine 516 can be bypassed.

In various examples, the activation engine 516 can include multiple separate execution channels. In these examples, the execution channels can correspond to the columns of the processing engine array 510, and can perform an operation on the outputs of a column, the result of which can be stored in the memory subsystem 504. In these examples, the activation engine 516 may be able to perform between 1 and n parallel computations, where n is equal to the number of columns in the processing engine array 510. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 502 can include a pooling engine 518. Pooling is the combining of outputs of the columns of the processing engine array 510. Combining can include for example, computing a maximum value, a minimum value, an average value, a median value, a summation, a multiplication, or another logical or mathematical combination. In various examples, the pooling engine 518 can include multiple execution channels that can operating on values from corresponding columns of the processing engine array 510. In these examples, the pooling engine 518 may be able to perform between 1 and n parallel computations, where n is equal to the number of columns in the processing engine array 510. In various examples, execution channels of the pooling engine 518 can operate in parallel and/or simultaneously. In some examples, the pooling engine 518 can be bypassed.

Herein, the activation engine 516 and the pooling engine 518 may be referred to collectively as execution engines. The processing engine array 510 is another example of an execution engine. Another example of an execution engine is a Direct Memory Access (DMA) engine, which may be located outside the accelerator 502.

Input data 550 can arrive over the communication fabric 520. The communication fabric 520 can connect the accelerator 502 to other components of a processor, such as a DMA engine that can obtain input data 550 from an Input/Output (I/O) device, a storage drive, or a network interface. The input data 550 can be, for example one-dimensional data, such as a character string or numerical sequence, or two-dimensional data, such as an array of pixel values for an image or frequency and amplitude values over time for an audio signal. In some examples, the input data 550 can be three-dimensional, as may be the case with, for example, the situational information used by a self-driving car or virtual reality data. In some implementations, the memory subsystem 504 can include a separate buffer for the input data 550. In some implementations, the input data 550 can be stored in the memory banks 514 when the accelerator 502 receives the input data 550.

In some examples, the accelerator 502 can implement a neural network processing engine. In these examples, the accelerator 502, for a set of input data 550, can execute a neural network to perform a task for which the neural network was trained. Executing a neural network on a set of input data can be referred to as inference or performing inference.

The weights for the neural network can be stored in the memory subsystem 504, along with input data 550 on which the neural network will operate. The neural network can also include instructions, which can program the processing engine array 510 to perform various computations on the weights and the input data. The instructions can also be stored in the memory subsystem 504, in the memory banks 514 or in a separate instruction buffer. The processing engine array 510 can output intermediate results, which represent the outputs of individual layers of the neural network. In some cases, the activation engine 516 and/or pooling engine 518 may be enabled for computations called for by certain layers of the neural network. The accelerator 502 can store the intermediate results in the memory subsystem 504 for inputting into the processing engine array 510 to compute results for the next layer of the neural network. The processing engine array 510 can further output final results from a last layer of the neural network. The final results can be stored in the memory subsystem 504 and then be copied out to host processor memory or to another location.

Figure 6:
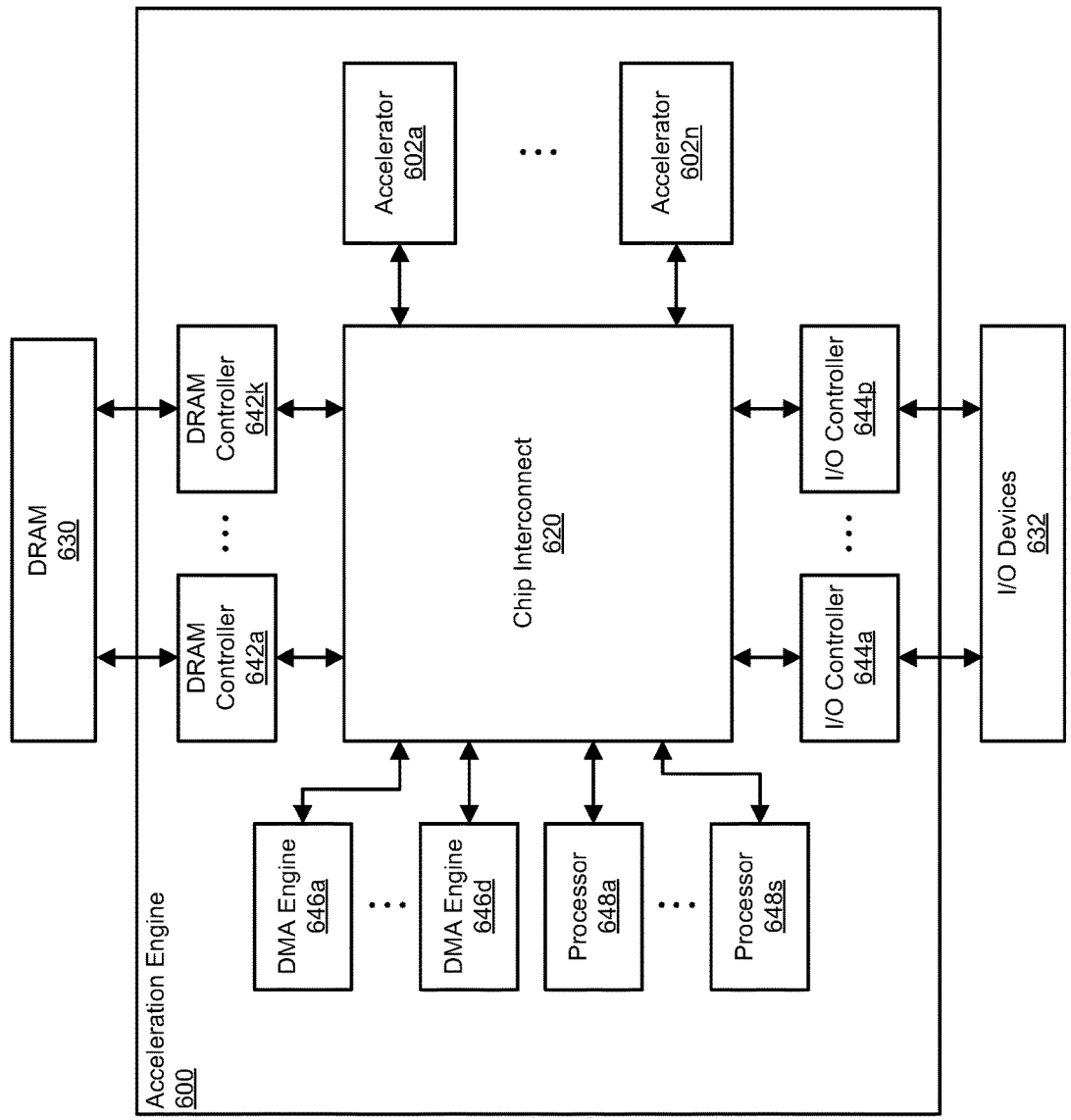
FIG. 6 includes a block diagram that illustrates an example of an acceleration engine.

FIG. 6 includes a block diagram that illustrates an example of an acceleration engine 600. The acceleration engine 600 is an example of an integrated circuit that can include one or more accelerators 602a-602n that may be similar to the accelerator illustrated in FIG. 5.

In the example of FIG. 6, the acceleration engine 600 includes multiple accelerators 602a-602n, each of which can perform a set of operations. In various examples, the accelerators 602a-602n are for particular types of operations, so that the accelerators 602a-602n can perform the operations much faster than when similar operations are performed by a general purpose processor. In various examples, to perform a set of operations, input data on which the operations are to be performed must first be moved into the accelerators 602a-602n. Additionally, in some cases, program code is also moved into the accelerators 602a-602n, which programs the operations that the accelerators 602a-602n will perform on the data. In the illustrated example, the acceleration engine 600 includes n accelerators 602a-602n. Examples of accelerators that can be included in the acceleration engine 600 include graphics accelerators, floating point accelerators, neural network accelerators, and others. In various examples, the accelerators 602a-602n can each be the same (e.g., each of the is a graphics accelerator) or can be different (e.g., the accelerators 602a-602n include a graphics accelerator, a floating point accelerator, and neural network accelerator).

The example acceleration engine 600 further includes DRAM controllers 642a-642k for communicating with an external memory. The external memory is implemented, in this example, using DRAM 630. In the illustrated example, the acceleration engine 600 includes k DRAM controllers 642a-642k, each of which may be able to communicate with an independent set of banks of DRAM. In other examples, other types of RAM technology can be used for the external memory. The DRAM controllers 642a-642k can also be referred to as memory controllers.

In various examples, input data and/or program code for the accelerators 602a-602n can be stored in the DRAM 630. Different programs can cause the accelerators 602a-602n to perform different operations. For example, when one of the accelerators is a neural network accelerator, one program can configure the neural network accelerator to perform speech recognition while another program can configure the neural network accelerator to perform image recognition. In various examples, different accelerators 602a-602n can be programmed with different programs, so that each performs a different set of operations. In various examples, the processors 648a-648s can manage moving of program code from the DRAM 630 to the accelerators 602a-602n.

The example acceleration engine 600 further includes I/O controllers 644a-644p for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644p can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers 644a-644p, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

Movement of data in the acceleration engine 600 can be managed by one or more processors 648a-648s, which can also be referred to as data management processors. In the example of FIG. 6, the acceleration engine 600 includes s processors 648a-648s incorporated into the device (e.g., on the same silicon die). In other examples, the processors 648a-648s can be external to the acceleration engine 600 (e.g., on a different die and/or in a different package). In some examples, the processors 648a-648s can manage the movement of data from I/O devices 632 to the accelerators 602a-602n or the DRAM 630. For example, input data may be located at an I/O device 632 or in processor memory, and the processors 648a-648s can move the input from the I/O device 632 or processor memory into an accelerator or into DRAM 630. As another example, program code for the accelerators 602a-602n may be located on an I/O device 632 or in processor memory.

The example acceleration engine 600 further includes DMA engines 646a-646d that can move data between the accelerators 602a-602n, DRAM controllers 642a-642k, and I/O controllers 644a-644p. In the illustrated example, the acceleration engine 600 includes d DMA engines 646a-646d. In some implementations, the DMA engines 646a-646d can be assigned to specific tasks, such as moving data from the DRAM controllers 642a-642d to the accelerators 602a-602n, or moving data between the I/O controllers 644a-644p and the accelerators 602a-602n. These tasks can be assigned, for example, by enqueueing descriptors with the DMA engines 646a-646d, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

In various examples, each of the processors 648a-648s can be responsible for managing the data movement for a different accelerator. In some examples, a processor may manage the data movement for more than one accelerator. Similarly, in various examples, each of the processors 648a-648s can be assigned to one or more DMA engines 646a-646d. In these and other examples, associations between processors 648a-648s, accelerators 602a-602n, and DMA engines 646a-646d are determined by program code being executed by each respective processor.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
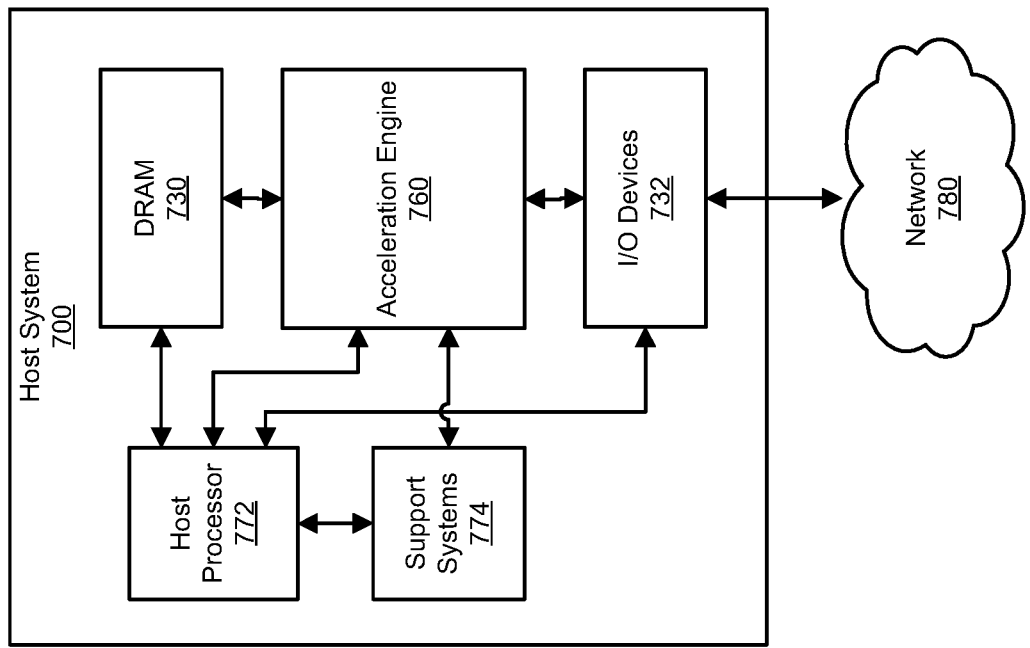
FIG. 7 includes a block diagram that illustrates an example of a host system.

FIG. 7 includes a block diagram that illustrates an example of a host system 700 in which an acceleration engine 760 can be used. The acceleration engine 760 of FIG. 7 is an example of a device that can include one or more accelerators such as is illustrated in FIG. 6. The example host system 700 of FIG. 7 includes the acceleration engine 760, a host processor 772, DRAM 730 or processor memory, I/O devices 732, and support systems 774. In various implementations, the host system 700 can include other hardware that is not illustrated here.

The host processor 772 is a general purpose integrated circuit that is capable of executing program instructions. In some examples, the host processor 772 can include multiple processing cores. A multi-core processor may include multiple processing units within the same processor. In some examples, the host system 700 can include more than one host processor 772.

In some examples, the host processor 772 and the acceleration engine 760 can be one chip, such as, one or more integrated circuits within the same package.

In various examples, the host processor 772 can communicate with other components in the host system 700 over one or more communication channels. For example, the host system 700 can include a host processor bus, which the host processor 772 can use to communicate with the DRAM 730, for example. As another example, the host system 700 can include an I/O bus, such as a PCI-based bus, over which the host processor 772 can communicate with the acceleration engine 760 and/or the I/O devices 732, for example. In various examples, the host system 700 can, alternatively or additionally, include other communication channels or busses, such as serial busses, power management busses, storage device busses, and so on.

In some examples, software programs executing on the host processor 772 can receive or generate input for processing by the acceleration engine 760. In some examples, the programs can select an appropriate neural network to execute for a given input. For example, a program may be for language translation, and can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network. In some examples, once the acceleration engine 760 has started an inference on input data, the host processor 772 can manage the movement of data (such as weights, instructions, intermediate results, results of conditional layers, and/or final results) into or out of the acceleration engine 760.

In some examples, a software program that is using the acceleration engine 760 to conduct an inference can read the result from a conditional layer from the acceleration engine 760 and/or from a storage location, such as in DRAM 730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 730 is memory that is used by the host processor 772 for storage of program code that the host processor 772 is in the process of executing, as well as values that are being operated on. In some examples, the data for a neural network (e.g., weight values, instructions, and other data) can be all or partially stored in the DRAM 730. DRAM is a common term for processor memory, and though DRAM is volatile memory, processor memory can be volatile and/or non-volatile. Though not illustrated here, the host system 700 can include other volatile and non-volatile memories for other purposes. For example, the host system 700 can include a Read-Only Memory (ROM) that stores boot code for booting the host system 700 at power on, and/or Basic Input/Output System (BIOS) code.

Though not illustrated here, the DRAM 730 can store instructions for various programs, which can be loaded into and be executed by the host processor 772. For example, the DRAM 730 can be storing instructions for an operating system, one or more data stores, one or more application programs, one or more drivers, and/or services for implementing the features disclosed herein.

The operating system can manage and orchestrate the overall operation of the host system 700, such as scheduling tasks, executing applications, and/or controller peripheral devices, among other operations. In some examples, a host system 700 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 700. For example, some drivers can provide communication between the operating system and peripheral devices or I/O devices 732. Alternatively or additionally, some drivers may provide communication between application programs and the operating system, and/or application programs and peripheral devices accessible to the host system 700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices. The I/O devices 732 can also include storage drives and/or network interfaces for connecting to a network 780. For example, the host system 700 can use a network interface to communicate with storage devices, user terminals, other computing devices or servers, and/or other networks, among various examples.

In various examples, one or more of the I/O devices 732 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 700 or may be in an external enclosure. A storage device can be fixed (e.g., attached by screws) or removable (e.g., having a physical release mechanism and possibly a hot-plug mechanism).

Storage devices, the DRAM 730, and any other memory component in the host system 700 are examples of computer-readable storage media. Computer-readable storage media are physical mediums that are capable of storing data in a format that can be read by a device such as the host processor 772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 732 can be PCI-based devices. In these examples, a PCI-based I/O device includes a PCI interface for communicating with the host system 700. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 772. In some examples, the program executed by the microprocessor is stored on the hardware of microprocessor, or on a non-volatile memory chip in the host system 700. In some examples, the microprocessor and the acceleration engine 760 can be on chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network processing engine of the neural network processor. In some examples, the support systems 774 may need to load the data for the neural network onto the acceleration engine 760 before the acceleration engine 760 can start executing the neural network. In these and other examples, the support systems 774 can further receive the output of executing the neural network, and provide the output back to the host processor 772.

In some examples, the operations of the support systems 774 can be handled by the host processor 772. In these examples, the support systems 774 may not be needed and can be omitted from the host system 700.

In various examples, the host system 700 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules. Any of the methods described herein can be implemented as a computer-readable medium or computer program product comprising instructions which, when the program is executed by one or more computers, cause the one or more computers to carry out the steps of the method. Such computer program products can be transmitted, over a wired or wireless network, in a data carrier signal carrying the computer program product.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing device comprising:
    a first neural network accelerator having:
        a first array of processing elements; and
        a first state buffer configured to store a first neural network model from a host memory, the first neural network model having a first set of weight values and a first set of instructions for performing computations on the first set of weight values by the first array of processing elements;
    a local memory configured to load a second neural network model from the host memory while the first neural network accelerator is performing the computations on the first set of weight values, the second neural network model having a second set of weight values and a second set of instructions for performing computations on the second set of weight values; and
    a second neural network accelerator coupled to the first neural network accelerator, the second neural network accelerator having:
        a second array of processing elements; and
        a second state buffer configured to load the second neural network model read from the local memory to perform computations on the second set of weight values by the second array of processing elements.

2. The computing device of claim 1, wherein the local memory is configured to store a third neural network model, and wherein the first neural network accelerator is configured to replace the first neural network model stored in the first state buffer with the third neural network model from the local memory after the first neural network accelerator has performed the computations on the first set of weight values.

3. The computing device of claim 2, wherein loading the first neural network model onto the first state buffer from the host memory has a higher latency than loading the third neural network model onto the first state buffer from the local memory.

4. The computing device of claim 1, wherein the first neural network accelerator is coupled to the host memory via a peripheral bus interface.

5. A neural network processor comprising:
an array of processing elements;
a state buffer coupled to the array of processing elements;
a peripheral bus interface for interfacing with a host memory, the peripheral bus interface configured to load a first neural network model from the host memory onto the state buffer for execution by the array of processing elements; and
a memory interface for interfacing with a local memory, the memory interface configured to load a second neural network model from the local memory onto the state buffer for execution by the array of processing elements, and replace the second neural network model in the local memory with a third neural network model from the host memory after the second neural network model has been loaded onto the state buffer,
wherein the peripheral bus interface is configured to load the second neural network model onto the local memory from the host memory during execution of the first neural network model by the array of processing elements.

6. The neural network processor of claim 5, wherein the state buffer is configured to store a plurality of neural network models for execution by the array of processing elements.

7. The neural network processor of claim 5, wherein the local memory is configured to store a plurality of neural network models.

8. The neural network processor of claim 5, wherein loading the first neural network model from the host memory onto the state buffer has a longer latency than loading the second neural network model from the local memory onto the state buffer.

9. The neural network processor of claim 5, wherein the peripheral bus interface is configured to load the second neural network model onto the local memory from the host memory using direct memory access.

10. The neural network processor of claim 5, wherein the first neural network model includes a first set of weight values and a first set of instructions for performing computations on the first set of weight values.

11. The neural network processor of claim 5, wherein the first neural network model and the second neural network model are different models for a same application.

12. The neural network processor of claim 5, wherein the neural network processor is a first neural network processor, the state buffer is a first state buffer, and the peripheral bus interface is a first peripheral bus interface, and wherein the first neural network processor further includes a second peripheral bus interface for interfacing with a second neural network processor.

13. The neural network processor of claim 12, wherein the second peripheral bus interface is configured to load the second neural network model from the local memory onto a second state buffer of the second neural network processor.

14. A method comprising:
loading, by a neural network processor, a first neural network model from a host memory onto a state buffer of the neural network processor;
executing, by the neural network processor, the first neural network model using an array of processing elements of the neural network processor;
retrieving, by the neural network processor, a second neural network model from the host memory while the first neural network model is being executed by the array of processing elements;
storing, by the neural network processor, the second neural network model from the host memory in a local memory of the neural network processor;
loading, by the neural network processor, the second neural network model onto the state buffer of the neural network processor;
executing, by the neural network processor, the second neural network model using the array of processing elements; and
replacing, by the neural network processor, the second neural network model in the local memory with a third neural network model from the host memory after the second neural network model has been loaded onto the state buffer.

15. The method of claim 14, wherein loading the second neural network model from the local memory onto the state buffer of the neural network processor has a shorter latency than loading the first neural network model from the host memory onto the state buffer of the neural network processor.

16. The method of claim 14, wherein the second neural network model is retrieved from the host memory for storage onto the local memory using direct memory access.

17. The method of claim 14, further comprising storing a plurality of neural network models in the local memory.

18. The method of claim 17, further comprising loading the third neural network model from the local memory onto a state buffer of a neural network coprocessor.

19. The method of claim 18, wherein the third neural network model is loaded onto the state buffer of the neural network coprocessor while the second neural network model is being executed by the array of processing elements of the neural network processor.

20. The method of claim 17, wherein the plurality of neural network models are different models associated with a same application.

21. A non-transitory computer readable medium storing code, which when executed by a processor of a computing system, causes the computing system to:
load a first neural network model from a host memory onto a state buffer of a neural network accelerator for execution by the neural network accelerator;
load a second neural network model from the host memory onto a local memory of the neural network accelerator while the first neural network model is being executed by the neural network accelerator;
load the second neural network model from the local memory onto the state buffer of the neural network accelerator for execution by the neural network accelerator; and
replace the second neural network model in the local memory with a third neural network model from the host memory after the second neural network model has been loaded onto the state buffer of the neural network accelerator.

* * * * *